United States Patent Office 2,827,126
Patented Mar. 18, 1958

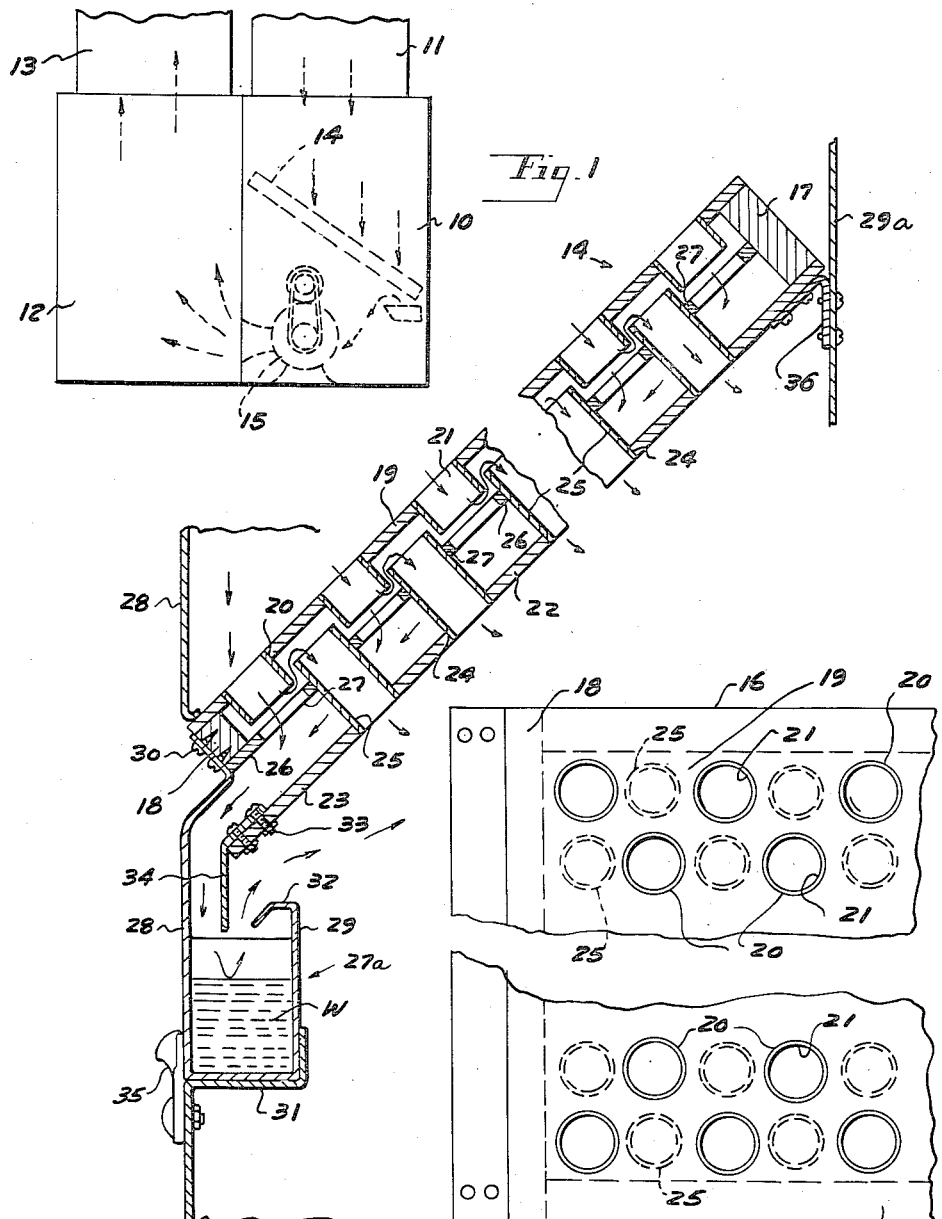

2,827,126

AIR SEPARATORS FOR HEATING PLANTS

Mitchell Mazur, Detroit, Mich.

Application March 18, 1957, Serial No. 646,732

3 Claims. (Cl. 183—30)

The invention pertains to separators which may be installed in a cold air duct through which air is drawn into that portion of a heating plant which contains a source of heat and from which air, upon being heated, is released through outgoing ducts.

The separator is made in the form and size of conventional air filters used for the purpose of intercepting from the air particles of solid matter, such as dust, but includes novel and useful features by reason of which the separator is more efficient and capable of long operative use without need of being replaced.

I shall now describe my improvement with reference to the accompanying drawings in which:

Fig. 1 is a diagrammatical presentation of a heating plant, including the intake portion of cold air, the view disclosing the location of the separator and of an air-blower by means of which air is drawn into the heating plant;

Fig. 2 is a sectional view in the vertical plane of the separator as installed in said plant;

Fig. 3 is a fragmentary top elevational view of said separator.

Similar numerals refer to similar parts throughout the several views.

In the diagram shown in Fig. 1, numeral 10 indicates the portion of the heating plant into which air to be heated is first drawn through a duct 11 to be delivered to unit 12. Here the air is heated by a suitable heat-generating unit and allowed to rise upwardly through outlet channels or ducts 13. The separator 14, to which my invention pertains, is disposed within said unit 10, while the blower impelling the air into said unit 12 is identified by numeral 15.

The separator is made in the form of a rectangular flat case, including a frame composed of two side walls 16 and two end walls 17 and 18, respectively, the latter being only about half as wide as said wall 17.

Mounted upon the frame and forming a top of said case is a cover 19, the marginal portions of the cover being secured to the side walls and to both end walls of the frame. The cover is provided with a plurality of circular apertures 20, and fitted into each of them is a short cylindrical tube 21 which is open at both ends, one end of each tube being set flush with the upper surface of the cover, while the other end extends into the interior of the case.

A panel 22, which is disposed parallel to said cover 20, is secured to the underside of the frame forming the bottom of the case. The panel is secured along its marginal portions to the side walls 16 of the frame and to one end wall 17, but is spaced from the other or the narrow end wall 18, the portion of the panel so spaced being marked 23. This is a feature to which I shall refer again.

Like the top cover, the panel 22 is provided with a plurality of circular apertures 24 which are substantially of the same size as apertures 20 but which are in a staggered relation to said apertures. Fitted into each of said apertures 24 is a cylindrical tube 25, all the tubes extending inwardly into the casing towards the top cover but terminating in a plane spaced from said cover.

Disposed between the top cover 19 and the bottom panel 22, in a spaced parallel relation to both, is a board 26 which along its edges is connected to the walls of the frame, including the lower end wall 18. As the aforesaid panel 22 is spaced from said end wall 18, the structure, including said board 26, will result in the formation of a passageway or duct between the lower end portion 23 of the panel 22 and said board 26. The board, which in effect divides the casing into two chambers, the upper one and the lower one, contains a plurality of circular apertures 27, some of which are in axial alinement with the tubes 21 in the top cover, while others are in axial alinement with the apertures 24 in the bottom panel 22. The area of the board 26 between the apertures 27 forms a webbing which serves as a partition between said chambers and as a baffle in the path of the air volume admitted into the casing through the tubes 21. It will be noted that the tubes 25, extending inwardly from the panel 22, fit into said apertures 27 and project upwardly from the board 26 into the upper chamber and towards the top cover 19.

As shown in the drawings, the separator is mounted for use in an oblique position so that one end wall, 17, of the frame, which may be called the upper end wall, is at a level above that of the opposite or lower end wall 18. Secured to said lower end wall 18 is a horizontally-disposed trough or pan 27a, one wall of which, marked 28, extends upwardly above the level of the opposite wall 29 and is secured to said end wall 18 by means of screws 30. The trough rests on an integrally-formed shelf 31 which is formed by an inwardly-bent portion of one wall of the unit 10 of the heating plant. The opposite or lower wall of the trough includes, at the top, a portion 32 which is bent inwardly in a hairpin turn into the trough. Secured to the lower end portion 23 of the bottom panel 22 by screws 33 is a baffle plate 34 which is disposed parallel to wall 28 of the trough midway said wall and the portion 32 of the lower wall.

The separator with the trough form a unit which ordinarily may be held against displacement by means of a member 40 pivotally mounted upon the wall structure of the heating plant below the level of the shelf 31. At the upper end the separator may be secured to the wall 29a of unit 10 by a bracket 36. If necessary, the separator with the trough may be easily removed from its operative position shown in Fig. 2 in order that it may be inspected or cleaned.

At this point I wish to add that the component elements of the separator may be made of any suitable material, but that the separator in its preferred form may include the frame made out of wood, while the top cover, the bottom panel, and the intermediately-disposed board 26 may be made of Masonite or a similar composition. As for the tubes used in the separator, they may be made of any suitable material of a character which will be unaffected by moisture but will be resistant to corrosion. Thus, tubes made of fiber or cardboard, if impregnated or coated with a protective substance, could be well used for the purpose.

I shall now describe the manner of the operative use of said separator.

With the blower installed under the separator, as shown in the drawings, air will be drawn downwardly from cold air duct 11 through the separator. More specifically, as said air will be first drawn from above into the separator through said tubes 21 in the top cover 19.

A part of the volume so drawn through each tube 21, named herein an intake tube, will enter the lower chamber and will be drawn from the chamber at one end thereof through a passageway between the board 26 and the panel 22. The air so drawn will pass over a water-filled trough 27a, the water serving as a trap for particles of dust carried by said air. The movement of this volume of air is indicated in the drawings by arrows leading from tubes 21 into the lower chamber, and by the arrows in the lower chamber pointing in the direction of the above-named passage under the board 26.

The remaining volume of air passing through each intake tube 21, particularly the air hugging the inner surface of each said tube, will be diverted under the pull of the blower from the level of the lower end of the intake tube upwardly to the upper end of an adjoining tube 25, named herein an outlet tube. As the air moves with considerable velocity, and as the upward turn is sharp and abrupt, the dust particles, being of higher specific gravity, will continue in their downward movement till they shall have entered the lower chamber. As the lower chamber serves as a channel or duct for air which has already entered said chamber from the intake tubes 21, and as said air moves in a current towards the water trap, the dust precipitated from the air by said sudden upward turn will be carried towards said water trap and intercepted therein.

Thus, a part of the volume of air entering each intake tube 21 enters the lower chamber and is pulled towards the water trap in order that its dust particles may be intercepted thereby, while another part of said volume is diverted upwardly in said upper chamber, loses some of its dust by reason of the sharp turn, then enters the adjoining outlet tube or tubes, and is drawn, minus all or some of its dust, downwardly from said separator. The dust trapped by water will settle down to the bottom of the container, from which it may be periodically removed.

It will be understood that some changes may be made in the structure of the separator without departing from the inventive concept disclosed herein.

What I, therefore, wish to claim is as follows:

1. An air separator for incoming air in a heating plant, the separator comprising a flat casing having a top cover, a bottom panel, and an intermediately-disposed board dividing the casing into an upper chamber and a lower chamber, the board having a plurality of circular apertures, the cover including a plurality of tubes extending from said cover into the upper chamber, the tubes being in axial alinement with some of the apertures in the board and being open at both ends to admit air from outside the casing into the upper chamber, the bottom panel having a plurality of tubes extending therefrom inwardly through the remaining apertures in the board into said upper chamber, the tubes in the bottom panel being in a staggered relation to the tubes in the cover said tubes being open at both ends to serve as an outlet from the air in the casing outwardly thereof, the casing being open at one end.

2. A separator for air drawn into a heating plant, the separator comprising a flat, rectangular casing disposed obliquely to the direction of the incoming air and having a lower end and an upper end, the casing including a top cover, a bottom panel, and an intermediately-disposed board dividing the casing into two parallel chambers, the upper one and the lower one, the board being provided with a plurality of apertures, the top cover being provided with a plurality of apertures for reception of tubes open at both ends and disposed at right angle to the cover, each of the tubes extending into the upper chamber, said tubes being in axial alinement with some of the apertures in the board and serving to admit air from outside into said casing, the bottom panel being provided with a plurality of tubes set at right angle in said panel and being open at both ends, the tubes being in a staggered relation to the tubes of the cover and extending through the remaining of the apertures in the board into the upper chamber, but terminating short of the top cover, the lower end of the casing below said board being open, and an open pan secured to the lower end of the casing, the pan being adapted to contain water for contact with air passing out of the open end of the casing downwardly.

3. A separator for the air intake duct of a heating plant, the separator comprising a rectangular casing, a top cover, a bottom panel, and an intermediately-disposed board, one end wall being disposed between said board and the top cover but leaving an open passage betwen said board and said bottom panel, the casing being disposed in the duct obliquely to the direction of the incoming air and having two side walls, a lower end wall and an upper end wall, the board being provided with a plurality of apertures, the top cover being provided with a plurality of apertures for reception of tubes open at both ends and disposed at right angle to the cover, for admission of air through said tubes from outside into said casing each of the tubes extending into the upper chamber, said tubes being in axial alinement with some of the apertures in the board, the bottom panel being provided with a plurality of apertures for reception of tubes open at both ends and serving as an outlet for air from within the casing, the tubes being in a staggered relation to the tubes of the cover and extending through the remaining of the apertures in the board into the upper chamber, but terminating short of the top cover, the lower end of the casing below said board being open, and an open pan secured to the lower end of the casing, the pan being adapted to contain water for contact with air passing out of the open end of the casing downwardly.

References Cited in the file of this patent

UNITED STATES PATENTS

| | | |
|---|---|---|
| 675,276 | Hanson | May 28, 1901 |
| 2,188,206 | Pfeffer et al. | Jan. 23, 1940 |
| 2,490,116 | Danz | Dec. 6, 1949 |

FOREIGN PATENTS

| | | |
|---|---|---|
| 587,316 | France | Apr. 16, 1925 |
| 820,169 | France | Nov. 5, 1937 |